June 30, 1964        G. LANGE        3,139,016

RANGE FINDER DEVICE FOR PHOTOGRAPHIC CAMERAS

Filed June 21, 1961        2 Sheets-Sheet 1

3,139,016
RANGE FINDER DEVICE FOR PHOTOGRAPHIC CAMERAS
Günther Lange, Konigsbronn, Wurttemberg, Germany, assignor to Carl Zeiss, Oberkochen, Wurttemberg, Germany
Filed June 21, 1961, Ser. No. 118,670
Claims priority, application Germany June 23, 1960
2 Claims. (Cl. 95—44)

The invention relates to a range finder device which is connected with the objective of a photographic camera, particularly with the objective of a motion picture camera or of a television camera.

In accordance with an important object of the invention, a portion of the light entering the camera objective, which light is used for producing the picture on the film, is deflected from its usual path and is conducted to a double optical wedge sharpness or focusing indicator which is arranged in the real image plane of the path of the light rays of the view finder.

It has been proposed heretofore to provide single lens mirror reflex cameras with a combined range finder and view finder in which within a small central portion of the view finder picture plane are arranged two oppositely arranged optical wedges which are positioned one next to the other and along a plane arranged perpendicularly to the refracting edges of the two wedges which plane passes through the center of the picture plane and preferably extends parallel to the long side of the rectangular view finder image. For adjusting the image appearing on the film to a maximum picture sharpness, either the entire camera objective or parts of the same are adjusted lengthwise of the optical axis until the two halves of an image produced by the two optical wedges are brought into vertical alinement within the small central area of the view finder image. This means the adjustment takes place until one half of the picture appearing above the horizontal division line will be positioned in alinement with the lower half of the picture appearing in the same area. This adjustment in range finders is known as split image method.

In order to be able to observe the entire image of the view finder as it will be produced on the film, it has been proposed heretofore to construct the remaining portion of the view finder image which surrounds the mentioned central portion with the two optical wedges in the form of a ground glass plate or in the form of a Fresnel lens or a Fresnel wedge screen. Such arrangements are, however, relatively expensive.

Therefore, in accordance with another object of the present invention, a view finder device is constructed which is considerably less expensive and which has the form of a range finder in which the sharpness indicator comprises two optical wedge faces of which each optical wedge face covers completely one half of the view finder image area, whereby the surface normals of the two wedge faces are arranged in such a manner that the angle bisector between the two normal directions is positioned parallel to the optical axis which passes through the indicator and in which each of the two wedge faces with the thickest portion of the wedge, namely with the base of the wedge, is arranged on the shorter side of the rectangular view finder image, while the thinner portion of the wedge has from the opposite shorter side of the finder image area a definite distance $d$. This distance $d$ has a size within the limits of .16 to .36 D, wherein D is the length of the diagonal of the view finder image area.

With such a construction of the double optical wedge there is, however, only a sharpness indication by such portions of the picture possible which are intersected in the central portion. Since, however, the most important part of the scene to be photographed lies usually within the neighborhood of the center of the finder image area, the case will occur very seldom indeed, where a sharpness indication for picture portions rather distant from the axis of the picture is required. By extending the wedges on the side of their base up to the short sides of the finder image, one obtains the advantage of a view finder image which is not interrupted by a ground glass plate or a Fresnel lens. Such known interrupted image has different brightnesses compared with its central portion. The new construction of the range finder device has the further advantage that it may be produced in a very simple manner and therefore will be inexpensive.

With these and other objects in view, the invention will now be described in more detail with reference to the accompanying drawing which illustrates two embodiments of the range finder device of the invention:

Figure 1:
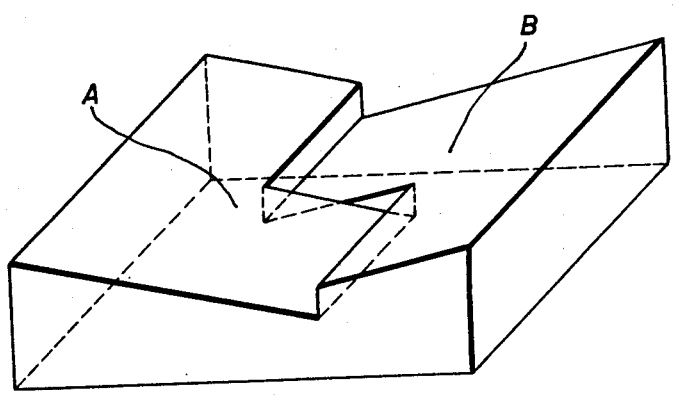
FIG. 1 is a perspective view of the optical wedge arrangement of the present invention.
Figure 2:
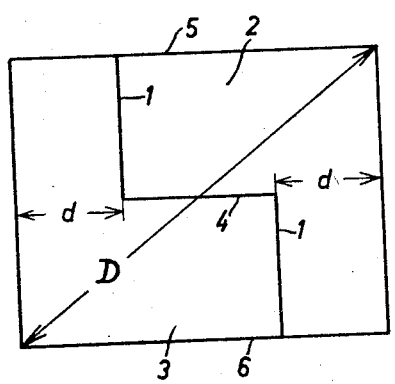
FIG. 2 is a top view of the unitary wedge plate.

Referring to FIG. 1, it will be noted that the two congruent wedge surfaces A and B are arranged one next to the other in such a manner that the wedge faces form an obtuse angle. According to FIG. 2, the division line 1 between the two wedge bodies 2 and 3 has a central portion 4 which is parallel to the long sides 5 and 6 of the rectangular finder image area.

Figure 3:
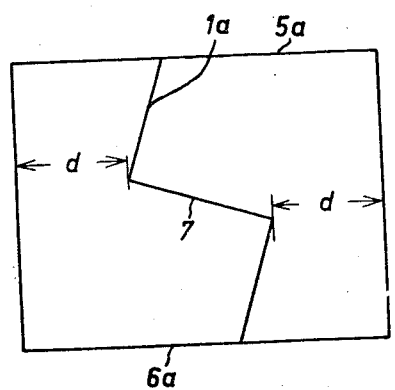
FIG. 3 is a top view of a modified construction of the double wedge plate.

The modified embodiment of the invention as shown in FIG. 3 shows a division line 1a which extends inclined to the long horizontal lines 5a and 6a of the rectangular view finder image area, and also the central portion 7 of the division line 1a is arranged at an inclination but forms an angle of 90° with the outer portions of the division line 1a.

The new double wedge block forming the range finder device of the invention covers the entire view finder image area and may be produced in one piece in a molding press, as it is particularly clear from FIG. 1.

Figure 4:
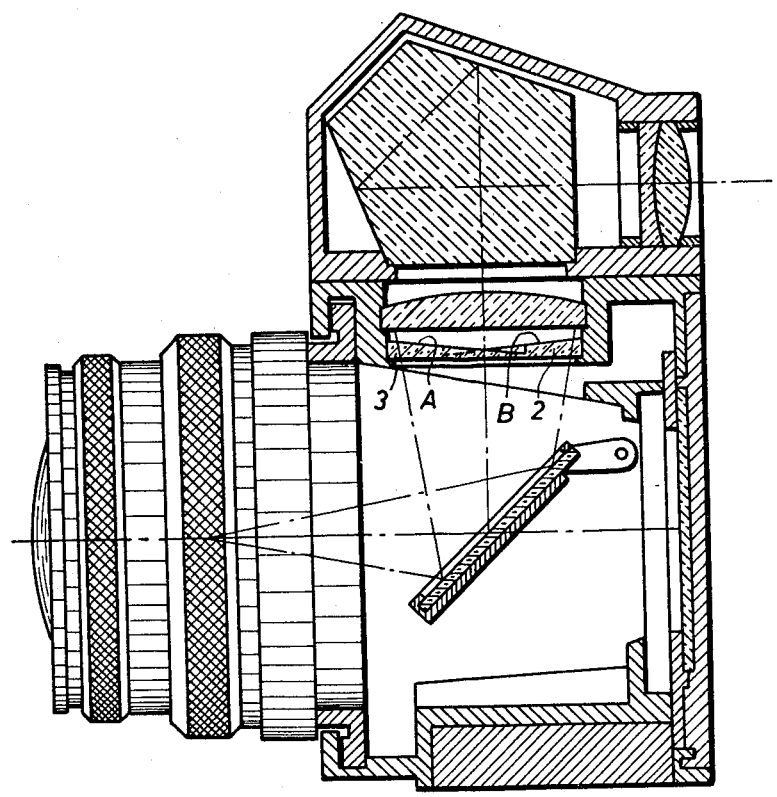
FIG. 4 illustrates diagrammatically a photographic camera whose view finder is provided with a double wedge plate in accordance with the invention.

In FIG. 4 there is shown the location of the double wedge focussing indicator in the view finder light path of the camera, which indicator is turned by 90° in a plane normal to the optical axis of the view finder light path for better showing the shape in section.

What I claim is:

1. Range finder device connected with the objective of a photographic camera having a rectangular view finder image area, means for deflecting a portion of the light entering said objective into said range finder which contains a real image plane, a double optical wedge forming a sharpness indicator arranged in said image plane, said double optical wedge having two oppositely inclined truncated wedge faces in side by side relation of which each face covers one half of said view finder image area, the truncated portions of said wedge faces being offset from the transverse center line of said double optical wedge, the face normals of said two wedge faces are positioned in such a manner that the angle bisector between said two normals is parallel to the optical axis of said sharpness indicator, each wedge being positioned with its thick end at the short side of the rectangular view finder image area, while the thin portion of each optical wedge is spaced from the opposite short side of the rectangular view finder area a distance which is equal to .16 to .36 of the length of the diagonal of said rectangular view finder image area.

2. A focusing plate for the rectangular view finder image area of a photographic camera, comprising a double optical wedge plate covering the entire view finder image area, said wedge plate having a plane surface on one side and two oppositely inclined wedge surfaces on the opposite side each of which covers one half of said view finder image area, each wedge surface being positioned with its thick end at the short side of the rectangular view finder image area, while the thin portions of each optical wedge overlaps the other along a median line and terminates in a truncated connecting wall surface, each wall surface is spaced from the opposite short side of the rectangular view finder area a distance which is equal to .16 to .36 of the length of the diagonal of said rectangular view finder image area.

References Cited in the file of this patent

UNITED STATES PATENTS

| | | |
|---|---|---|
| 2,526,204 | Dodin | Oct. 17, 1950 |
| 2,669,916 | Dodin | Feb. 23, 1954 |